May 1, 1962 C. A. FOWLER ETAL 3,032,717
METHOD AND APPARATUS FOR MULTIPLEXING AND DELAYING NORMAL AND COHERENT VIDEO ON ONE DELAY LINE
Filed June 4, 1959
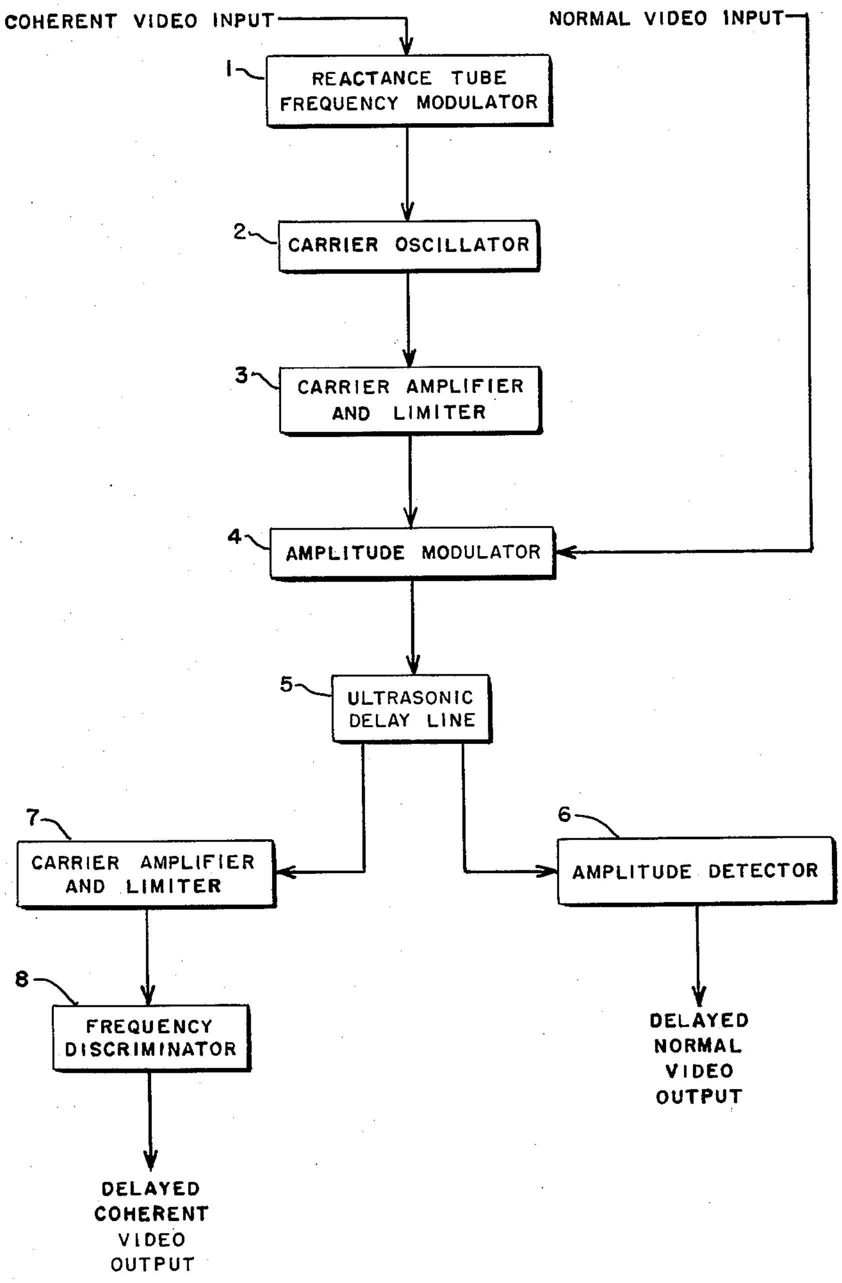
INVENTORS,
CHARLES A. FOWLER
CHARLES H. GAGER.
BY
Harry M. Saragovitz
ATTORNEY.

3,032,717

METHOD AND APPARATUS FOR MULTIPLEXING AND DELAYING NORMAL AND COHERENT VIDEO ON ONE DELAY LINE

Charles A. Fowler, East Norwich, and Charles H. Gager, West Islip, N.Y., assignors to the United States of America as represented by the Secretary of the Army Filed June 4, 1959, Ser. No. 818,235
3 Claims. (Cl. 329—147)

This invention relates to the transmission of radiant energy and more particularly to a method and apparatus for multiplexing normal and coherent video signals on one delay line.

In many radar systems for moving-target indicators it is required the incoming signals from two signal sources be delayed by exactly the same amount. Thus, in a system utilizing normal video derived from an amplitude-modulated receiver and coherent video derived from a phase-modulated receiver, there exists an inter-signal or interpulse time period which may be repeated in a given sequence or code.

In the decoding of the interpulses it is essential that both the normal and coherent video signals be delayed by an equal time interval, that there be no crosstalk between the normal and coherent video channels and that the delay line be capable of delaying signals ranging from D.-C. to several megacycles.

Accordingly, the objects of this invention are to provide a method and apparatus for delaying by an equal amount normal and coherent video pulses ranging from very low frequencies to very high frequencies and without introducing crosstalk between the pulses.

These and other objects are attained by frequency-modulating a carrier wave with the coherent video input, amplifying and limiting the carrier, applying the amplified frequency modulated carrier and the normal video input to an amplitude modulator, extracting the A-M and F-M modulated carrier from the modulator and passing it through a quartz delay line, applying the output of the delay line to an amplitude detector and to a frequency detector for obtaining delayed normal and coherent video pulses.

The nature of this invention will be more fully understood from the following detailed description and by reference to the accompanying drawing, the single FIGURE of which is a schematic diagram in block form of a circuit in accordance with this invention.

In the circuit shown, the coherent video phase-detected input signal derived from a low impedance "coherent" receiver is applied to a reactance-tube modulator 1, frequency modulating the output carrier wave from oscillator 2. To raise the output power level of the frequency modulated wave and to eliminate any possible amplitude modulation contained therein, it is applied to a carrier amplifier and limiter 3. The amplified F-M wave from amplifier 3 is fed to the grid of a conventional amplitude modulator 4, such as a grid-modulated class C amplifier.

The normal video input signal derived from a "normal" receiver is used as the amplitude modulating voltage. Hence, the output carrier wave from the A-M modulator 4 is F-M modulated by the coherent video input and A-M modulated by the normal video input. This amplitude and frequency modulated carrier wave is applied to an ultrasonic delay line 5, preferably made of quartz. The output of the delay line 5 is fed into two channels.

The first channel consists of an amplitude detector 6 from which a delayed normal video signal is extracted. In the second channel the output of the ultrasonic delay line 5 is first applied to a carrier amplifier and limiter 7, which removes the crosstalk between the normal and coherent video signals and minimizes the effects of amplitude modulation on the frequency detection channel. The output of the limiter 7 is then applied to a frequency discriminator 8 which provides a delayed coherent video signal.

Hence, the method as described in this invention, which consists in using the signals desired to be delayed by an equal interval of time as the modulating signals of a common carrier wave, utilizes only one delay line and consequently eliminates the need of a second delay line with its associated circuitry. Moreover, when two delay lines are used for delaying separately the normal and coherent video signals, matching networks are required to equalize the delay time of both delay lines. Since no ideal matching networks exist which will make the delay time of both delay lines exactly equal, the improvement of the present method over the prior art can be readily appreciated.

Although the present method has been described with the minimum number of steps, it should be understood that additional conventional steps such as amplification, filtration, etc., may be added without departing from the broad aspects of this invention.

What is claimed is:

1. In a circuit for delaying by exactly equal time delays a first and a second video signal comprising, in combination, a carrier oscillator, means for frequency modulating with said first signal the output carrier wave of said oscillator, an ultrasonic delay line means for amplitude modulating the frequency-modulated carrier with said second signal and applying the amplitude and frequency-modulated wave to said ultrasonic delay line, means for frequency detecting said first signal from the output of said delay line and means for amplitude detecting said second signal from the output of said delay line.

2. In a circuit for delaying by exactly equal time delays a first and a second video signal comprising, in combination, a carrier oscillator, reactance-tube means for frequency-modulating said oscillator with said first video signal, means for amplifying and limiting the frequency-modulated carrier from said oscillator, an ultrasonic delay line, means for amplitude modulating the frequency-modulated carrier with said second signal and applying the amplitude and frequency-modulated carrier to said ultrasonic delay line, means for frequency detecting said first signal from the output of said delay line and means for amplitude detecting said second signal from the output of said delay line.

3. The combination of claim 2 wherein said frequency detecting means includes an amplifier and a limiter for eliminating the cross-talk between said first and said second video signals.

References Cited in the file of this patent

UNITED STATES PATENTS

| | | |
|---|---|---|
| 2,524,702 | Hansell | Oct. 3, 1950 |
| 2,593,071 | Sunstein et al. | Apr. 15, 1952 |
| 2,619,547 | Ross | Nov. 25, 1952 |
| 2,650,357 | Munster | Aug. 25, 1953 |
| 2,800,580 | Davies | July 23, 1957 |
| 2,852,771 | Ruvin | Sept. 16, 1958 |
| 2,858,369 | Kahn | Oct. 28, 1958 |
| 2,913,660 | Clark | Nov. 17, 1959 |